(12) United States Patent
Bader et al.

(10) Patent No.: US 7,571,795 B2
(45) Date of Patent: Aug. 11, 2009

(54) COUPLING DEVICE OF A MOTOR VEHICLE

(75) Inventors: Josef Bader, Friedrichshafen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 458 days.

(21) Appl. No.: 11/542,992

(22) Filed: Oct. 4, 2006

(65) Prior Publication Data

US 2007/0080040 A1 Apr. 12, 2007

(30) Foreign Application Priority Data

Oct. 6, 2005 (DE) .................. 10 2005 047 930

(51) Int. Cl.
*F16D 25/08* (2006.01)

(52) U.S. Cl. .................. 192/91 A; 192/85 CA; 60/565

(58) Field of Classification Search ............ 192/85 C; 60/555, 560, 565
See application file for complete search history.

(56) References Cited

U.S. PATENT DOCUMENTS 3,908,514 A 9/1975 Rist 5,211,099 A 5/1993 Grosspietsch et al.
6,116,399 A * 9/2000 Drexl et al. ................ 192/91 A

FOREIGN PATENT DOCUMENTS

| AT | OE-305 788 | 3/1973 |
|---|---|---|
| DE | 2 115 443 | 11/1971 |
| DE | 30 11 777 A1 | 10/1981 |
| DE | 41 09 125 | 9/1992 |
| DE | 197 16 600 A1 | 12/1997 |
| DE | 197 16 660 A1 | 10/1998 |
| DE | 103 48 312 A1 | 5/2005 |
| GB | 1 323 794 | 7/1973 |
| SU | 1594000 A1 | 9/1990 |

* cited by examiner

*Primary Examiner*—Charles A Marmor
*Assistant Examiner*—Edwin A. Young
(74) *Attorney, Agent, or Firm*—Davis & Bujold, P.L.L.C.

(57) ABSTRACT

A coupling device of a motor vehicle with a clutch arranged in the force flow between a drive motor and a transmission and a dedicated servo-assisted control mechanism. The clutch is designed by way of a pressing spring as a passively lockable and via a clutch release sleeve disengageable and insertable dry friction coupling and the control mechanism includes an operative primary drive between a clutch pedal and the clutch release sleeve and a pneumatically operative servo drive with a pneumatic actuator ordered immediately to the clutch release sleeve and with a control valve controllable by the clutch pedal.

4 Claims, 3 Drawing Sheets

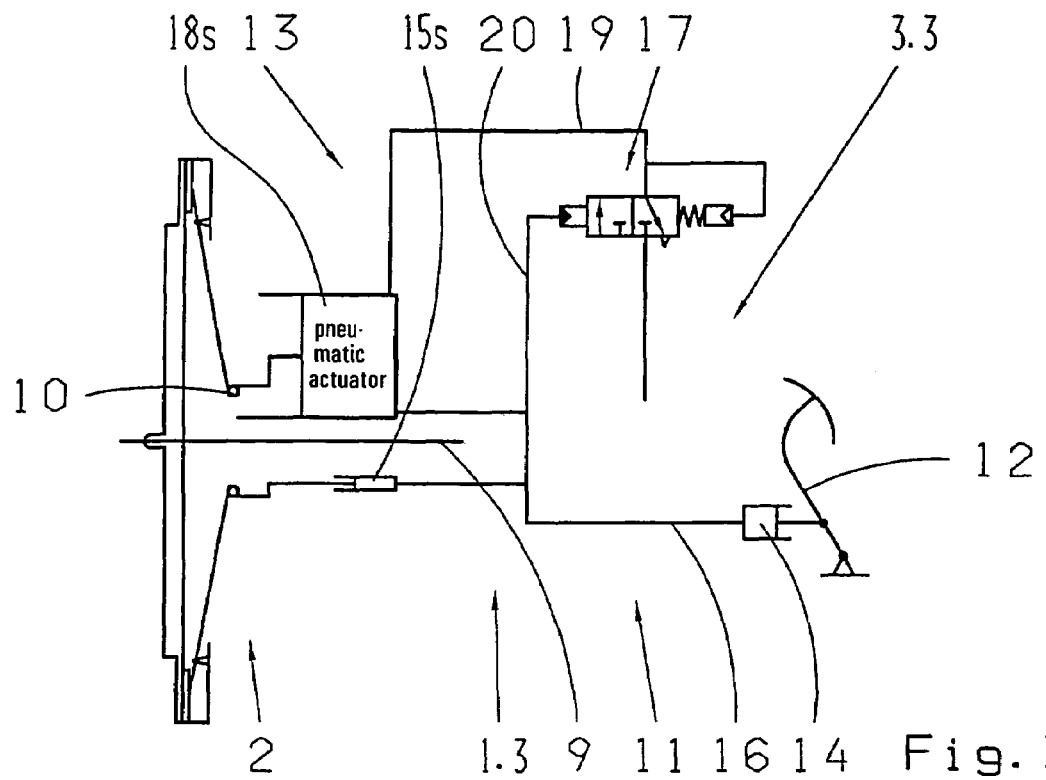
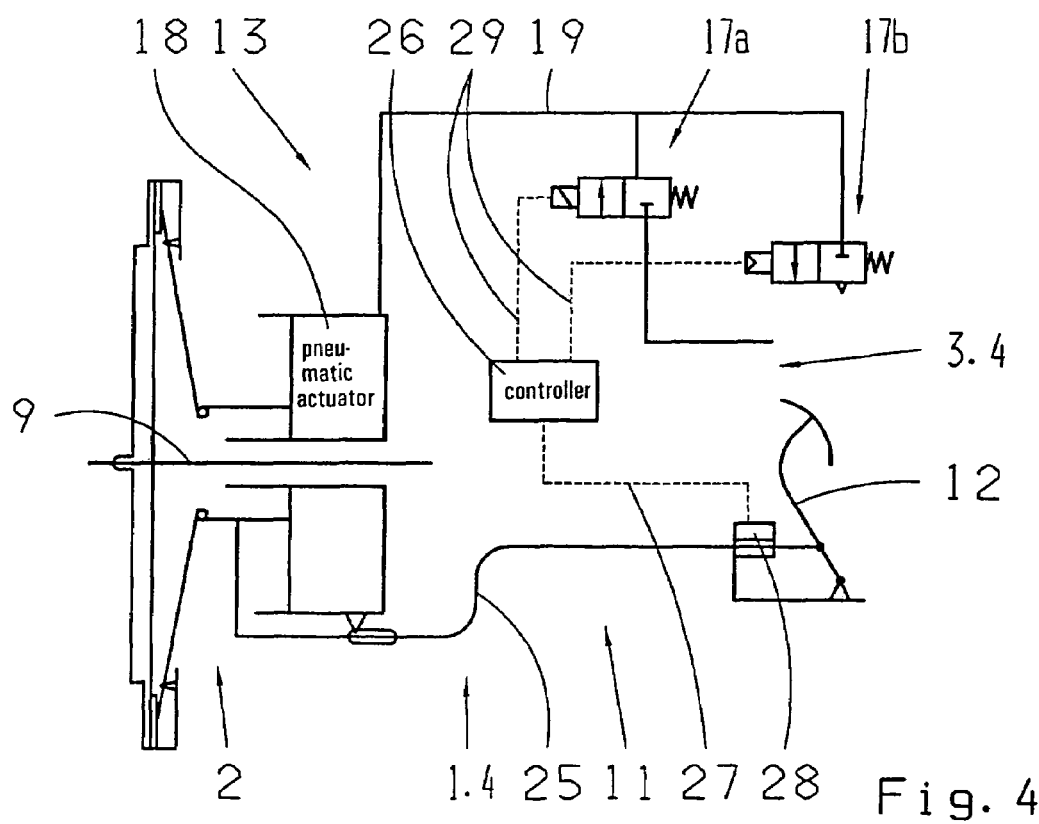

COUPLING DEVICE OF A MOTOR VEHICLE

This application claims priority from German Application Serial No. 10 2005 047 930.8 filed Oct. 6, 2005.

FIELD OF THE INVENTION

The invention concerns a coupling device of a motor vehicle with a clutch arranged in the force flow between a drive motor and a transmission and a dedicated servo-assisted control mechanism, wherein the clutch is designed by way of a pressing spring as a passively lockable and, via a clutch release sleeve, disengageable and insertable dry friction coupling, and wherein the control mechanism includes an operative primary drive between a clutch pedal and the clutch release sleeve as well as a pneumatically operative servo drive with a pneumatic actuator ordered immediately to the clutch release sleeve and with a control valve controllable by the clutch pedal.

A clutch arranged in the drive chain of a motor vehicle between a drive motor, designed generally as an internal combustion engine, and a transmission serves essentially as the transmission of a torque from the drive motor to the transmission and in the coasting mode also in reverse direction. Under normal conditions, therefore with inactive clutch pedal, the clutch is completely closed through the effect of the pressing spring and transmits the torque non-slip through adhesion. Only with start-up procedures, switching operations and emergency brakes is the clutch opened by the driver through the operation of the clutch pedal, and thereby the force flow is temporarily interrupted between the drive motor and the transmission.

With the start-up procedure, the clutch is again continuously closed with the inserted starting gear through which the torque of the drive motor is transmitted in the slip operation by sliding friction. Thus a rotation speed equalization occurs between the output shaft of the rapidly revving drive motor as well as the initially static and subsequently initially more slowly rotating input shaft of the transmission.

With the switching operation between an inserted load profile and a goal profile, which is to be inserted, the unencumbered layout of the load profile and subsequently the unencumbered synchronization and insertion of the goal profile is made possible by the release of the clutch. With an emergency braking, the driving power of the drive motor is taken from the drive wheels by the release of the clutch.

With most motor vehicles, the release of the clutch takes place, via a releasing element directly engaged or at least in contact with the clutch release sleeve, as a releasing lever, provided with an external coupling point arranged radially in the transmission bell housing and engaged with the clutch release sleeve, swivelled at the internal end as well as at the opposite external end or by way of a releasing shaft arranged tangentially in the transmission bell housing, pivoted, provided internally with a releasing fork engaged with the clutch release sleeve and externally with an external releasing lever.

The further transmission device, between the release element and the clutch pedal, is frequently purely mechanical, for example, as achieved by a tow-cable or a push rod or designed as an hydraulic transmission device, consisting of a master cylinder connected to the clutch pedal, a slave cylinder connected to the releasing element and a connecting line, which connects both actuators.

Such a coupling device with an insertion-dry-clutch, an hydraulic transmission device and a releasing lever is well known, for example, from DE 41 09 125 A1, in which a pressurization of a compensation tank connected to the master cylinder is additionally provided. Advantageous to such a control mechanism is the beneficial force-displacement translation achieved through the effective leverage in the releasing lever. Disadvantageous to it is, in addition, to the relatively large installation space requirement also a low precision of the clutch actuation effected through play-afflicted bearings, joints and guidances.

Hence, it has already been known for a long time, as is also described in DE 41 09 125 A1, with a hydraulic control mechanism to use a so-called central shifter in the form of a slave cylinder ordered to the clutch release sleeve inside the transmission bell housing co-axially to the input shaft of the transmission with a ring-shaped solid cylinder and an annular piston moving axially to it instead of a release lever and a slave cylinder affecting it externally. Through this, a precise actuation of the clutch is indeed made possible. The beneficial force-displacement translation of leverage is, however, thereby canceled, which with the clutch actuation leads unfavorably to higher pressure on the pedal at the clutch pedal. With the ring-shaped central shifter, it also involves an expensive special subassembly through the arrangement of which, in addition with a leakage escaping hydraulic means, can fall on the friction surfaces of the clutch and consequently can impair their functions.

Nevertheless, in order to achieve low pressure on the pedal with a coupling device provided with a central shifter, a clutch-control mechanism can be provided as is generally known with a servo-support. For this it is well known, in particular for the use in heavier commercial vehicles which, due to corresponding permit provisions, are equipped with a compressed air system, parallel to a primary drive operative between the clutch pedal and the clutch release sleeve to provide a pneumatically operative servo drive with a pneumatic actuator ordered directly to the clutch release sleeve and a control valve controllable by the clutch pedal. Such a coupling device is described in some detail in DE 197 16 600 A1.

With these well known details of the coupling device, the slave cylinder of the hydraulic primary drive is integrated in each case with the actuator of the pneumatic servo drive in a common central shifter. In the process, the hydraulic actuator of the primary drive is arranged in each case radially inside of the pneumatic actuator of the servo drive and both actuators are connected with one another via a common piston element. However, it is disadvantageous to this well known coupling device that the central shifter is constructed in a complicated manner and is thus relatively expensive to produce, and that with a leakage escaping hydraulic means in the hydraulic actuator of the primary drive, as well as with a simple hydraulic control mechanism, provided with a centrally arranged slave cylinder it can impair the function of the clutch.

In the face of this background, the task which forms the basis of the invention at hand is to propose a coupling device of the initially mentioned type, whose control mechanism demonstrates an increased operational reliability with simple and cost-efficient construction.

SUMMARY OF THE INVENTION

The invention thus concerns a coupling device of a motor vehicle, with a clutch arranged in the force flow between a drive motor and a transmission and a dedicated servo-assisted control mechanism, wherein the clutch is designed by way of a pressing spring as a passively lockable and, via a clutch release sleeve, disengageable and insertable dry friction coupling, and wherein the control mechanism includes an operative primary drive between a clutch pedal and the clutch release sleeve as well as a pneumatically operative servo drive with a pneumatic actuator ordered immediately to the clutch release sleeve and with a control valve controllable by the clutch pedal.

An initial preferred solution of the problem consists of the fact that the pneumatic actuator of the servo drive is designed as a ring cylinder arranged co-axially to the input shaft of the transmission, the primary drive is designed as an hydraulic adjusting drive with a master cylinder on the pedal side and at least one slave cylinder on the clutch side, and the slave cylinder is arranged completely inside the pressure space of the pneumatic actuator wherein the solid cylinder of the slave cylinder is connected to the solid cylinder of the pneumatic actuator and the piston of the slave cylinder is connected to the piston of the pneumatic actuator.

Through the integration of minimally one hydraulic slave cylinder of the primary drive in the pressure space of the pneumatic actuator of the servo drive, on the one hand, installation space is saved and, on the other hand, the operational reliability is enhanced since, with a leakage entering into the slave cylinder, escaping hydraulic means cannot reach the friction surfaces of the clutch, but rather is held back in the pressure space of the pneumatic actuator. Likewise, with this arrangement, the units of the hydraulic slave cylinder and the pneumatic actuator can be kept geometrically simple and thus can be produced at a low-price.

The slave cylinder of the primary drive can be designed as a ring cylinder with an annular piston, which is arranged inside of the pneumatic actuator coaxially to the input shaft of the transmission. Through this, with the slave cylinder in addition to simple geometry, and as large as possible active surface of the piston ensues and therewith a relatively large force-displacement translation of the primary drive.

However, the use of several slave cylinders for the primary drive is also possible, which are arranged inside of the pneumatic actuator uniformly distributed axle-symmetrically on the peripheral side to the input shaft of the transmission. Through this, the use of standard-actuators is possible, which can be obtained from relevant manufacturers inexpensively and show a high operational reliability.

A second preferred solution to the problem consists of the fact that the servo drive shows several pneumatic actuators and that the primary drive is designed as a hydraulic adjusting drive with a master cylinder on the pedal side and several slave cylinders on the clutch side, and that the pneumatic actuator of the servo drive and the slave cylinder of the primary drive are arranged at the clutch release sleeve alternately and uniformly distributed axle-symmetrically on the peripheral side to the input shaft of the transmission.

With this embodiment, both for the primary drive as well as for the servo drive, standard configurations of hydraulic or pneumatic actuators can be used, wherein the production costs of the actuation equipment is reduced and the operational reliability increased.

With the aforementioned details, the control valve of the servo drive is designed advantageously as an hydraulically controllable proportional valve, whose control piston is connected via a hydraulic control pressure space and a hydraulic control cable to the hydraulic primary drive. Through this, a technical control coupling of the servo drive with the clutch pedal is realized in a relatively simple manner.

In contrast thereto, a third preferred solution to the problem consists of the fact that the pneumatic actuator of the servo drive is designed as a ring cylinder arranged coaxially to the input shaft of the transmission and the primary drive is designed as a mechanical adjusting drive connecting the clutch pedal with the clutch release sleeve.

In this connection, the previously used hydraulic components of the primary drive are saved and replaced by a mechanical adjusting drive. Through this, the geometrical construction of the pneumatic actuator can be simplified and the production costs of the whole control mechanism reduced. In this case, the adjusting force at the release of the clutch is applied to a large extent, against which the mechanical adjusting drive of the primary drive essentially serves as the technical control force and displacement feedback of the clutch release sleeve and the pressing spring respectively on the clutch pedal.

The primary drive is designed in this connection purposefully as a Bowden control arranged immediately between the clutch pedal and the clutch release sleeve, since this can be arranged with high tractive and pressure stability without further attachment and bearing points to a large extent of flexibly inside of a motor vehicle.

The control valve of the servo drive is designed in this case advantageously as an electrically controllable magnetic-proportional valve, whose control piston is connected, via a control magnet, and an electrical control cable to an electronic control unit which, in turn, is connected via an electrical sensor line at least to an application sensor ordered to the primary drive.

As an application sensor, a force sensor is to be considered preferable which, for example, can be built by way of several strain gauges applied to a limited elastic section of the mechanical adjusting drive. However, the use of a displacement sensor is also possible through which the respective position of the clutch pedal or the mechanical adjusting drive can be determined.

However, as an alternative to an electronic control of the servo drive, a purely mechanical control of the servo drive can also be provided in that the relevant control valve is designed as a mechanically controllable proportional valve, whose control piston is coupled to the primary drive via a mechanical connection.

BRIEF DESCRIPTION OF THE DRAWINGS

The invention will now be described, by way of example, with reference to the accompanying drawings in which:

FIG. 3 is a third embodiment of the coupling device according to the invention in a schematic view;

FIG. 4 is a fourth embodiment of the coupling device according to the invention in a schematic view.

DETAILED DESCRIPTION OF THE INVENTION

Figure 1:
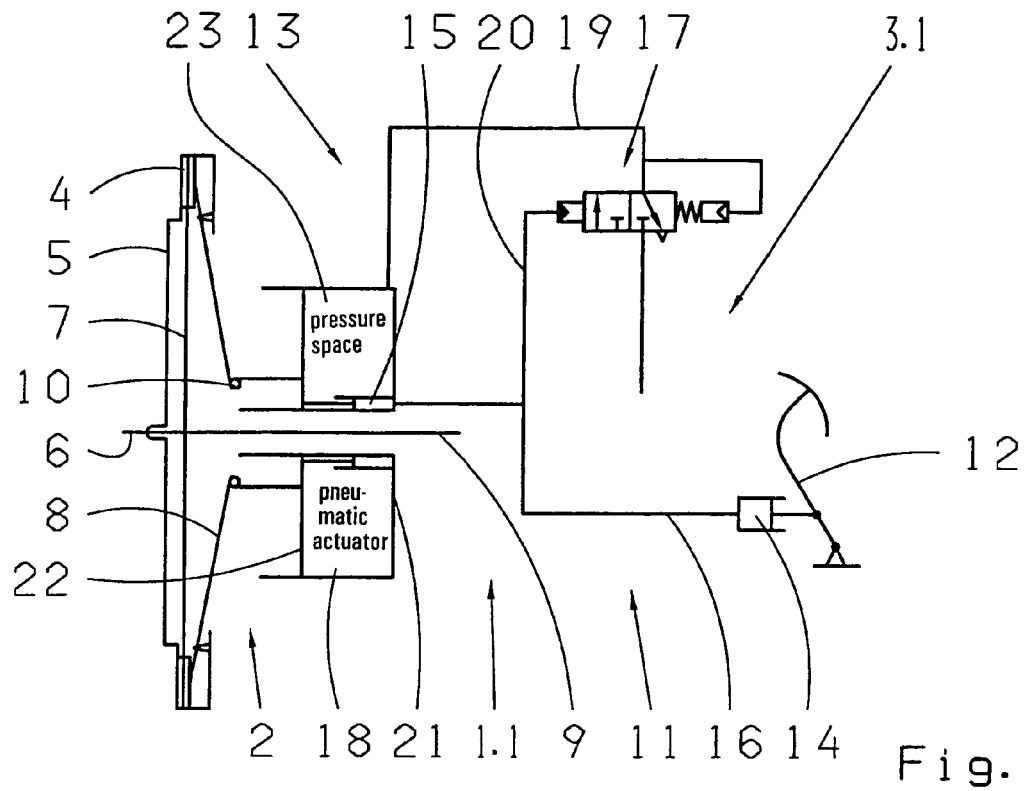
FIG. 1 is an initial embodiment of the coupling device according to the invention in a schematic view.

According to FIG. 1, a coupling device 1.1 shows a clutch 2 and a dedicated control mechanism 3.1. The clutch 2 is designed as an insertion-dry-clutch and, in an actually well-known way, includes a pressure plate 4, which is connected on the input side, via a fly wheel 5, to a crank shaft 6 of an internal combustion engine (not depicted in more detail), a driver disk 7, a pressing spring 8 loaded in inoperative condition, attached by one to the pressure plate 4 and designed as a diaphragm spring, is built in between the pressure plate 4 and the fly wheel 5 and is connected torque proof to an input shaft 9 of a transmission (not depicted in more detail). The clutch 2 is disengageable by an axial displacement of a clutch release sleeve 10 ordered to the pressing spring 8 in the direction of the internal combustion engine and reinsertable in the opposite direction by a subsequent axial displacement.

The control mechanism 3.1 is servo-assisted and thus, in addition, to a primary drive 11 through which a direct adjusting connection between a clutch pedal 12 and the clutch release sleeve 10 exists, also shows a servo drive 13, which represents an auxiliary power-operated, clutch actuator controllable via the clutch pedal 12. The primary drive 11 is available hydraulically effectively designed and includes a master cylinder 14 connected to the clutch pedal 12, a slave cylinder 15 connected to the clutch release sleeve 10 and a hydraulic connecting line 16, which connects both actuators 14, 15.

The servo drive 13 is designed pneumatically and effectively and includes a technical control valve 17 connected to the clutch pedal 12, a pneumatic actuator 18 connected to the clutch release sleeve 10 and a pneumatic connecting line 19, which connects the control valve 17 to the pneumatic actuator 18. The control valve 17 is available, designed as a 3/2-displacement-proportional valve with output pressure control, which is connected on the input side to a compressed air source and an unpressurized tank, as well as on the control side via a hydraulic control line 20 to the connecting line 16 of the primary drive 11.

The pneumatic actuator 18 of the servo drive 13 is designed as a so-called central shifter with a ring-shaped solid cylinder 21 and an axially mobile annular piston 22 therein and ordered immediately at the clutch release sleeve 10 coaxially to the input shaft 9 of the transmission. The slave cylinder 15 of the primary drive 11 is also available, designed as a ring cylinder, and is arranged inside a pressure space 23 of the pneumatic actuator 18 coaxially to the input shaft 9 of the transmission between the solid cylinder 21 and the annular piston 22.

Through the relatively direct contact of the clutch pedal 12 with the clutch release sleeve 10 via the hydraulic primary drive 11, the clutch 2 is particularly accurately and sensitively controllable by a driver via the clutch pedal 12. As a result of the relatively simple geometrical form of the pneumatic actuator 18 and of the hydraulic slave cylinder 15, these components can be produced at a comparatively low price, wherein additional installation space saved through the arrangement of the slave cylinder 15 inside the pneumatic actuator 18 and the impairment of the clutch 2 is reliably prevented due to withdrawal of leakage by hydraulic means from the slave cylinder 15.

Figure 2:
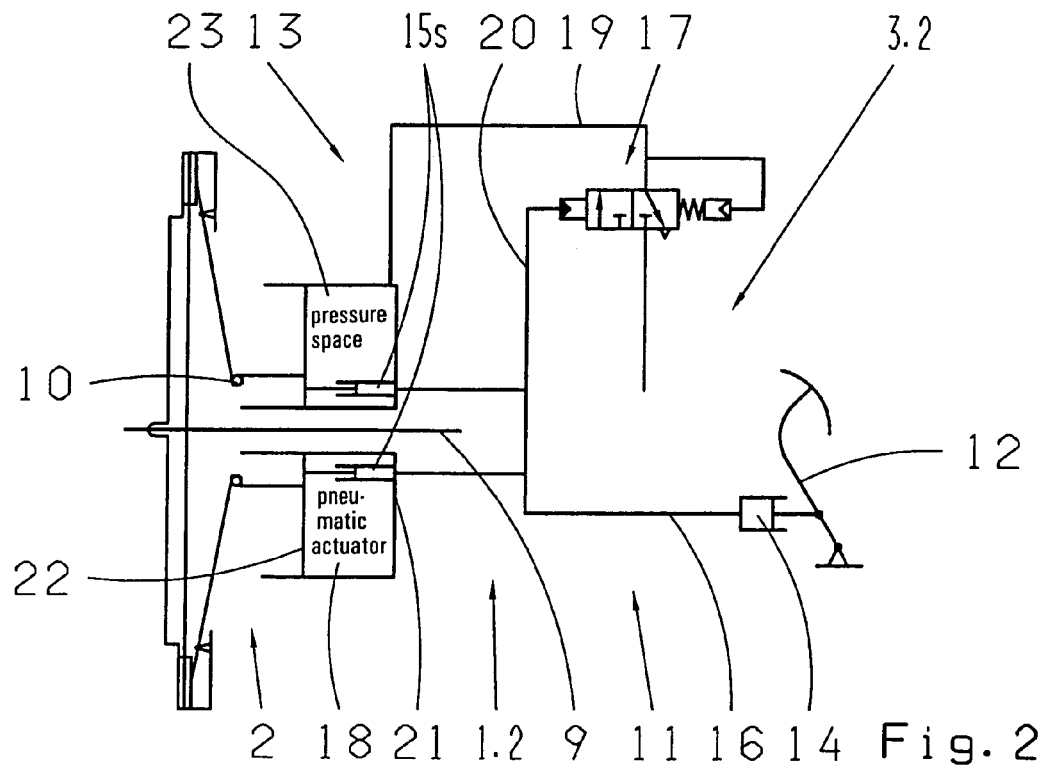
FIG. 2 is a second embodiment of the coupling device according to the invention in a schematic view.

According to FIG. 2, with a design version of a coupling device 1.2 with otherwise the same design and arrangement as with the details according to FIG. 1, the primary drive 11 is provided with several hydraulic slave cylinders 15s and these are ordered inside of the pneumatic actuator 18 on the peripheral side, uniformly distributed axle-symmetrically to the input shaft of the transmission. Through this, in addition to the already previously mentioned advantages, the use of cost-efficient and tested standard actuators as slave cylinders 15s of the primary drive 11 is possible.

With otherwise the same design as with both of the previously described details, with the coupling device 1.3 according to FIG. 3 both the primary drive 11 shows several hydraulic slave cylinders 15s and also the servo drive 13 several pneumatic actuators 18s. These actuators 15s and 18s are arranged alternately and uniformly distributed axle-symmetrically on the peripheral side to the input shaft 9 of the transmission at the clutch release sleeve 10, through which a uniform central transmission of force is ensured in the clutch release sleeve 10 and in the pressing spring 8. Other than for the slave cylinders 15s of the primary drive 11, simple and low-priced standard actuators can now also be used for the pneumatic actuators 18s of the servo drive 13.

Figure 5:
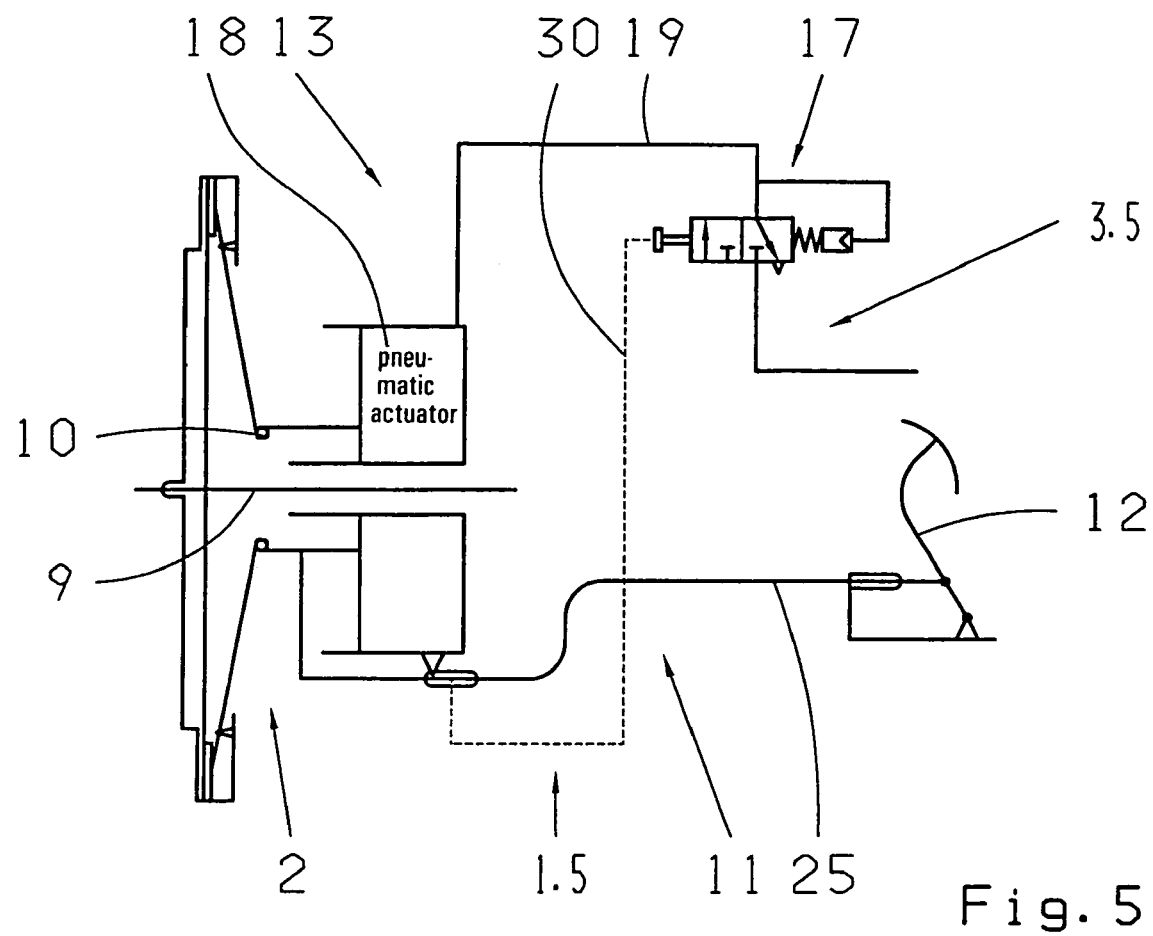
FIG. 5 is a fifth embodiment of the coupling device according to the invention in a schematic view.

In contrast to the previously described details, the primary drive 11 of control mechanisms 3.4 and 3.5 with coupling devices 1.4 as well as 1.5 is designed purely mechanically according to FIG. 4 and FIG. 5, and can exist, for example in a Bowden control 25, arranged between the clutch pedal 12 and the clutch release sleeve 10. The pneumatic actuator 18 of the servo drive 13 is designed in both cases, in the details according to FIG. 1 and FIG. 2, as a central shifter with a ring-shaped, solid cylinder 21 as well as the axially mobile annular piston 22 therein and arranged coaxially to the input shaft 9 of the transmission immediately at the clutch release sleeve 10.

According to FIG. 4, in the design version, the controller of the servo drive 13 consists of an electronic controller 26, which is connected via an electrical sensor line 27 to an application sensor 28 ordered to the clutch pedal 12, with which it preferably concerns a force sensor or a displacement sensor, and is connected via electrical control cable 29 to two available control valves 17a, 17b designed as 2/2-displacment-magnet-proportional valves. The one control valve 17a is connected on the input side to a compressed air source and the other control valve 17b to an unpressurized tank.

In the embodiment according to FIG. 5, the control valve 17 of the servo drive 13, as in the details according to FIG. 1 to FIG. 3, is designed as a 3/2-displacement-proportional valve with output pressure control, which, however, is from now on mechanically controllable, and whose control piston is coupled via a mechanical connection 30 with the primary drive 11.

Through the mechanical design of the primary drive 11, the control mechanism 3.3 and 3.5 of the respective coupling device 1.3 or 1.5 is further simplified in comparison to the previously describe hydraulic details and for this reason is designed more cost efficiently and reliably.

REFERENCE NUMERALS 1.1 coupling device
1.2 coupling device
1.3 coupling device
1.4 coupling device
1.5 coupling device
2 clutch
3.1 control mechanism
3.2 control mechanism
3.3 control mechanism
3.4 control mechanism
3.5 control mechanism
4 pressure plate
5 fly wheel
6 crank shaft
7 driver disk
8 pressing spring
9 input shaft
10 clutch release sleeve
11 primary drive
12 clutch pedal
13 servo drive
14 master cylinder
15 slave cylinder
15s slave cylinder
16 hydraulic connecting line
17 control valve
17a control valve 17b control valve
18 pneumatic-actuator
18s pneumatic-actuator
19 pneumatic connecting line
20 hydraulic control line
21 solid cylinder
22 annular piston
23 pressure space
24 slave cylinder
25 Bowden control
26 controller
27 electrical sensor line
28 application sensor
29 electrical control cable
30 mechanical connection

The invention claimed is:

1. A coupling device for a motor vehicle, the coupling device having a clutch (2) arranged in a force flow between a drive motor and a transmission and a dedicated servo-assisted control mechanism, the clutch (2) is, via a pressing spring (8), a passively lockable coupling, and via a clutch release sleeve (10), a disengageable dry friction coupling, and the control mechanism includes an operative primary drive (11) between a clutch pedal (12) and the clutch release sleeve (10) and a pneumatically operative servo drive (13) with a pneumatic actuator (18) immediately adjacent to the clutch release sleeve and with a control valve (17) controllable by the clutch pedal (12), the pneumatic actuator (18) of the servo drive (13) is a ring cylinder arranged coaxially to an input shaft (9) of the transmission and the primary drive (11) as an hydraulic adjusting drive with a master cylinder (14) on a pedal side and at least one slave-cylinder (15) on a clutch side, and the slave cylinder (15) is located completely inside of a pressure space (23) of the pneumatic actuator (18), a solid cylinder of the master cylinder (14) is connected to a solid cylinder (21) of the pneumatic actuator (18) and a piston of the slave cylinder (15) is connected to a piston (22) of the pneumatic actuator (18).

2. The coupling device according to claim 1, wherein the slave cylinder (15) of the primary drive (11) is a ring cylinder with an annular piston and is located inside of the pneumatic actuator (18) coaxially with the input shaft (9) of the transmission.

3. The coupling device according to claim 1, wherein the primary drive (11) has a plurality of slave cylinders (15s), and the plurality of slave cylinders (15s) are uniformly distributed inside the pneumatic actuator (18) and are axially-symmetrically located on a peripheral side to the input shaft (9) of the transmission.

4. The coupling device according to claim 1, wherein the control valve (17) of the servo drive (13) is a hydraulically controllable proportional valve, with a control piston connected to the hydraulic primary drive (11) via an hydraulic control pressure space and an hydraulic control line (20).

* * * * *